United States Patent
Elian et al.

(10) Patent No.: US 9,209,497 B2
(45) Date of Patent: Dec. 8, 2015

(54) SENSOR MODULE AND BATTERY ELEMENTS

(71) Applicant: Infineon Technologies AG, Neubiberg (DE)

(72) Inventors: Klaus Elian, Alteglofsheim (DE); Horst Theuss, Wenzenbach (DE); Guenther Ruhl, Regensburg (DE)

(73) Assignee: Infineon Technologies AG, Neubiberg (DE)

( * ) Notice: Subject to any disclaimer, the term of this patent is extended or adjusted under 35 U.S.C. 154(b) by 300 days.

(21) Appl. No.: 13/717,417

(22) Filed: Dec. 17, 2012

(65) Prior Publication Data

US 2014/0170446 A1  Jun. 19, 2014

(51) Int. Cl.
| | |
|---|---|
| *H01M 2/34* | (2006.01) |
| *H01M 10/48* | (2006.01) |
| *G01M 3/00* | (2006.01) |
| *G01M 3/32* | (2006.01) |
| *G01M 3/22* | (2006.01) |
| *G01M 3/36* | (2006.01) |
| *H01M 10/052* | (2010.01) |

(52) U.S. Cl.
CPC ............. *H01M 10/48* (2013.01); *G01M 3/227* (2013.01); *G01M 3/3272* (2013.01); *G01M 3/36* (2013.01); *H01M 2/345* (2013.01); *H01M 10/052* (2013.01); *H01M 2200/20* (2013.01)

(58) Field of Classification Search
CPC .............. H01M 2/342; H01M 10/052; H01M 2200/20; H01M 10/48; H01M 220/20; G01M 3/227; G01M 3/3272; G01M 3/36
USPC .................................. 429/61, 90; 73/49.3, 52
See application file for complete search history.

(56) References Cited

U.S. PATENT DOCUMENTS

| | | | |
|---|---|---|---|
| 6,342,826 B1 * | 1/2002 | Quinn et al. .................. 337/300 |
| 2004/0028995 A1 * | 2/2004 | Shelekhin et al. .............. 429/56 |
| 2007/0105010 A1 | 5/2007 | Cassidy | |
| 2009/0053586 A1 * | 2/2009 | Fredriksson et al. ........... 429/57 |
| 2010/0285338 A1 | 11/2010 | Christensen et al. | |
| 2011/0151336 A1 | 6/2011 | Lee et al. | |
| 2011/0273809 A1 | 11/2011 | Falsett et al. | |

* cited by examiner

*Primary Examiner* — Sean P Cullen
(74) *Attorney, Agent, or Firm* — Slater & Matsil, L.L.P.

(57) ABSTRACT

A sensor module includes an enclosure adapted to hermetically seal an opening or a hole on the outer surface of a casing or packaging, a sensor element and a membrane. The membrane is arranged between the enclosure and the opening or hole of the casing or packaging.

18 Claims, 4 Drawing Sheets

SENSOR MODULE AND BATTERY ELEMENTS

TECHNICAL FIELD

The present invention relates to a sensor module and battery elements.

BACKGROUND

Battery cells can be adversely affected, for example in the case of overload, excessive discharge current, severe external heating or mechanical electrolyte disintegration. Such adverse conditions may result in dangerous gases being released within the electrolyte of the battery cell. Consequently, the increase in battery cell internal pressure may result in rupture or even explosion of the respective battery element, releasing dangerous, e.g., flammable, substances. An early detection of the buildup of gases or increased gas pressure within the battery cell may provide for protection.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF ILLUSTRATIVE EMBODIMENTS

The aspects and embodiments are now described with reference to the drawings, wherein like reference numerals are generally utilized to refer to like elements throughout. In the following description, for purposes of explanation, numerous specific details are set forth in order to provide a thorough understanding of one or more aspects of the embodiments. It may be evident, however, to one skilled in the art that one or more aspects of the embodiments may be practiced with a lesser degree of the specific details. In other instances, known structures and elements are shown in schematic form in order to facilitate describing one or more aspects of the embodiments. It is to be understood that other embodiments may be utilized and structural or logical changes may be made without departing from the scope of the present invention. It should be noted further that the drawings are not to scale or not necessarily to scale.

In addition, while a particular feature or aspect of an embodiment may be disclosed with respect to only one of several implementations, such feature or aspect may be combined with one or more other features or aspects of the other implementations as may be desired and advantageous for any given or particular application. Furthermore, to the extent that the terms "include," "have," "with" or other variants thereof are used in either the detailed description or the claims, such terms are intended to be inclusive in a manner similar to the term "comprise." The terms "coupled" and "connected," along with derivatives may be used. It should be understood that these terms may be used to indicate that two elements cooperate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present invention is defined by the appended claims.

In several embodiments layers or layer stacks are applied to one another or materials are applied or deposited onto layers. It should be appreciated that any such terms as "applied" or "deposited" are meant to cover literally all kinds and techniques of applying layers onto each other. In particular, they are meant to cover techniques in which layers are applied at once as a whole like, for example, laminating techniques as well as techniques in which layers are deposited in a sequential manner like, for example, sputtering, plating, molding, CVD, etc.

The semiconductor chips may comprise contact elements or contact pads on one or more of their outer surfaces wherein the contact elements serve for electrically contacting the semiconductor chips. The contact elements may have any desired form or shape. They can, for example, have the form of lands, i.e., flat contact layers on an outer surface of the semiconductor package. The contact elements or contact pads may be made from any electrically conducting material, e.g., from a metal as aluminum, gold, or copper, for example, or a metal alloy, or an electrically conducting organic material, or an electrically conducting semiconductor material.

Figure 1:
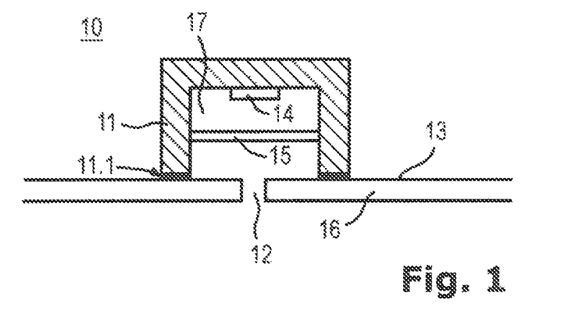
FIG. 1 shows a schematic cross-sectional side view representation of a sensor module according to an embodiment.

Referring to FIG. 1, there is shown a schematic cross-sectional side view representation of a sensor module 10 according to an embodiment. The sensor module 10 comprises an enclosure 11 adapted to hermetically seal an opening or a hole 12 on the outer surface 13 of a casing or packaging 16. In other words, the sensor module 10 is arranged on the outer surface 13 of a casing or packaging 16. The casing or packaging 16 may, for example, comprise any type of a container, e.g., a container for a battery cell or chemical materials, or parts thereof, which may for example produce gas. In particular, the casing or packaging 16 may provide an airtight housing having an inner volume (not shown) extending away from the opening or hole 12 in the direction opposite to the sensor module 10. The casing or packaging material may be rigid or flexible, and may, for example, have the shape of a box, a pipe, an envelope or a bag, wherein the envelope or bag may have been folded or wrapped around an axis.

The sensor module according to FIG. 1 shows a sensor element 14 and a membrane 15, wherein the membrane 15 is arranged between the enclosure 11 and the opening or hole 12 of the casing or packaging 16. The membrane 15 may be either gas-proof or diaphanous and may be flexible or rigid. In the embodiment shown in FIG. 1, the membrane 15 is a substantially flat element extending between the inner walls of the enclosure 11. The membrane 15 may be made of plastic, foil, metal, silicon or other materials. The membrane 15 may be made of the same material as the enclosure 11. In an embodiment, the membrane 15 may be fixed to the enclosure 11, e.g., by using adhesive materials or mechanical fixing elements.

In the embodiment according to FIG. 1, the membrane 15 and enclosure 11 define a cavity 17 enclosing the sensor element 14. In a different embodiment, the sensor element 14 may be arranged outside the cavity 17, for example on a surface of the membrane 15 opposite the cavity 17. In a further embodiment, the sensor element 14 may comprise the membrane 15.

For example, the membrane 15 may be a pressure sensitive membrane, i.e., a membrane which bends due to different pressures being present at the different sides of the membrane 15. Moreover, the sensor element 14 may be arranged on either of the two main surfaces of the membrane, for example in order to detect deformation of the membrane 15. The deformation may indicate the respective difference of the pressures which are present on the different sides of the membrane 15. By selecting a gas-proof membrane 15, and by arranging the sensor element 14 to be enclosed in the cavity 17, gases may be prevented from entering the cavity 17 and thereby damaging the sensor element 14.

In a further embodiment, the membrane 15 may be adapted to rupture, i.e., to become diaphanous, when the difference in gas pressures present at the different sides of the membrane 15 exceeds a limit, e.g., when the gas pressure inside the casing or packaging increases while the pressure inside the cavity 17 remains substantially constant.

In an embodiment, the membrane 15 is a gas filter, i.e., a filter which is diaphanous for selected types of gases. For example, the membrane 15 may be selected to be diaphanous for certain types of gases which may be produced in the electrolyte of a battery cell when the battery is damaged or is being operated inappropriately. In this case, the battery cell may be enclosed in the above mentioned casing or packaging 16, wherein the casing or packaging 16 may be gas-proof.

In an embodiment, the sensor element 14 may for example comprise a pressure sensor, a gas sensor or a mechanical stress sensor.

Figure 2:
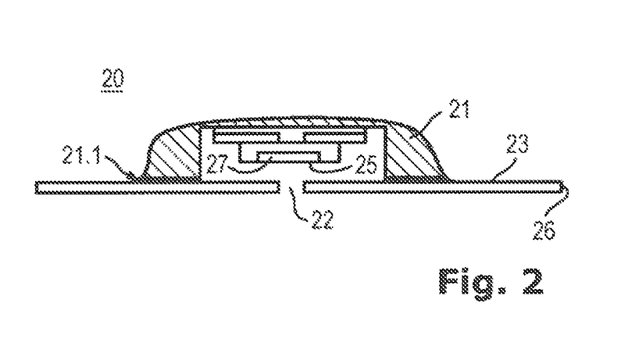
FIG. 2 shows a schematic cross-sectional side view representation of a sensor module according to an embodiment.

Referring to FIG. 2, there is shown a schematic cross-sectional side view representation of a sensor module 20 according to an embodiment. The sensor module 20 comprises an enclosure 21 adapted to hermetically seal an opening or a hole 22 on the outer surface 23 of a casing or packaging 26. The sensor module 20 further comprises a membrane 25 which is arranged between the enclosure 21 and the opening or hole 22. The membrane 25 and enclosure 21 define a cavity 27. The membrane 25 may be pressure sensitive, i.e., may represent a part of a sensor element measuring the difference between the pressures which are present at the different sides of the membrane 25. In other words, the sensor element may comprise the membrane 25.

Figure 3A:
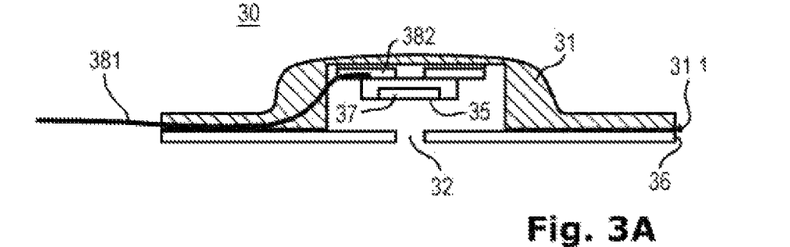
FIGS. 3A and 3B show schematic cross-sectional side view representations of a sensor module according to an embodiment.

Referring to FIG. 3A, there is shown a schematic cross-sectional side view representation of a sensor module 30 according to an embodiment. The sensor module 30 comprises an enclosure 31 adapted to hermetically seal an opening or a hole 32 on the outer surface of a casing or packaging 36. The sensor module 30 further comprises a membrane 35 which is arranged between the enclosure 31 and the opening or hole 32. As described above in relation to the embodiment according to FIG. 2, the membrane 35 may be pressure sensitive and may represent a part of a sensor element. The membrane 35 and enclosure 21 define a cavity 37. FIG. 3A shows a printed circuit board or semiconductor chip which provides contacts to the sensor element comprising the membrane 35. The contacts may for example provide for collecting sensor signals. In the embodiment shown in FIG. 3A, the sensor module 30 comprises cables 381 extending from the printed circuit board or semiconductor chip 382 to a surface of the enclosure 31, wherein the cables 381 are hermetically sealed by lamination between layers of the enclosure 31.

Figure 3B:
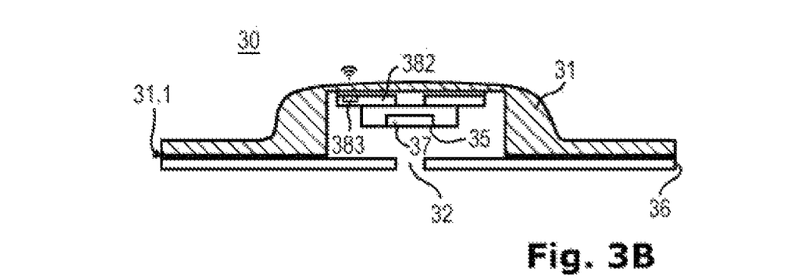

In a different embodiment, shown in FIG. 3B, rather than using cables for carrying the sensor signals, the semiconductor chip 382 may comprise communication means 383 adapted to transmit a sensor signal by wireless communications. In another embodiment, the semiconductor chip 382 is adapted to modulate a sensor signal onto a battery power current, wherein the respective battery cell providing the battery power current is enclosed in the above mentioned casing or packaging 36.

Figure 4:
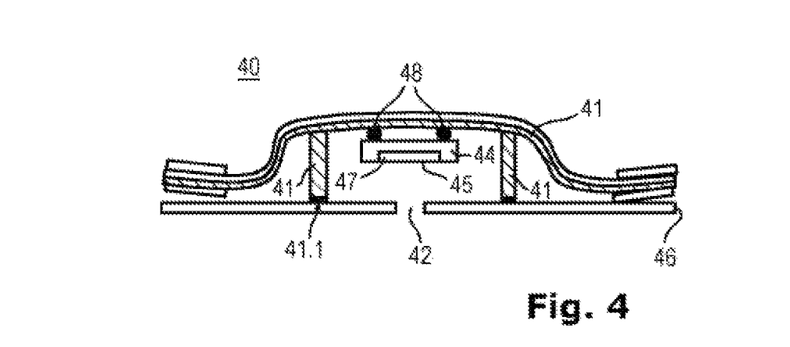
FIG. 4 shows a schematic cross-sectional side view representation of a sensor module according to an embodiment.

Referring to FIG. 4, there is shown a schematic cross-sectional side view representation of a sensor module 40 according to an embodiment. The sensor module 40 comprises an enclosure 41 adapted to hermetically seal an opening or a hole 42 on the outer surface of a casing or packaging 46. The sensor module 40 further comprises a membrane 45 which is arranged between the enclosure 41 and the opening or hole 42. As described above in relation to the embodiment according to FIG. 2, the membrane 45 may be pressure sensitive and may represent a part of a sensor element. Further, the membrane 45 may define an inner wall of a cavity 47 and may be connected to a sensor element 44. Moreover, in an embodiment, the enclosure 41 comprises a flexible printed circuit board which is soldered to the sensor element 44 at fixings 48. Thus, the flexible printed circuit board comprises conductive paths which are connected by soldering with the sensor element 44 and extend away from the sensor element 44. In another embodiment, the respective printed circuit board is stiff, i.e., not flexible.

Figure 5:
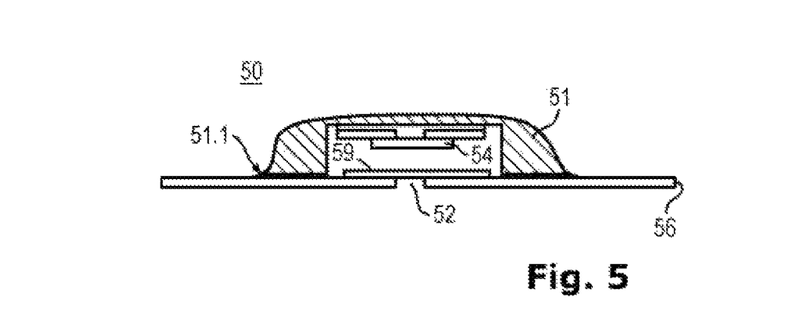
FIG. 5 shows a schematic cross-sectional side view representation of a sensor module according to an embodiment.

Referring to FIG. 5, there is shown a schematic cross-sectional side view representation of a sensor module 50 according to an embodiment. The sensor module 50 comprises an enclosure 51 adapted to hermetically seal an opening or a hole 52 on the outer surface of a casing or packaging 56. The sensor module 50 also comprises a sensor element 54 which is for example arranged on an inner wall of the enclosure 51, and may for example comprise a gas sensor or a pressure sensor. The pressure sensor may for example comprise a pressure sensitive layer and a cavity. The sensor module 50 comprises a membrane 59 which is arranged between the enclosure 51 and the opening or hole 52. Thus, in this embodiment, the membrane 59 may or may not be connected to the enclosure 51, i.e., may or may not extend between the inner walls of the enclosure 51. The membrane 59 comprises a film or layer arranged to cover the hole or opening 52 in the casing or packaging 56, wherein the film or layer may be a gas filter. For example, the membrane 59 may be diaphanous for certain types of gases which are produced in the electrolyte of a battery cell when the battery is damaged or is being operated inappropriately. In this case, the respective battery cell is enclosed in the casing or packaging 56, which may be gas-proof. Thus, for example, when the sensor element 54 detects an increase in gas pressure or the presence of specific gases, a respective sensor signal may be used to indicate that the battery is damaged or is being operated inappropriately.

The embodiments of sensor modules 10, 20, 30, 40, 50 shown in FIGS. 1 to 5 may further comprise a sealing means 11.1, 21.1, 31.1, 41.1, 51.1, wherein the sealing means 11.1, 21.1, 31.1, 41.1, 51.1 is adapted to have the enclosure 11, 21, 31, 41, 51 hermetically seal the opening or hole 12, 22, 32, 42, 52 of the casing or packaging 16, 26, 36, 46, 56. In an embodiment, the sealing means 11.1, 21.1, 31.1, 41.1, 51.1 may for example comprise one or more of clamps, latches, screws, screw threads, edge sealing, flexible layers, adhesive layers, adhesive materials or sealant materials.

In the embodiments of sensor modules 20, 30, 40, 50 shown in FIGS. 2 to 5 the enclosure 21, 31, 41, 51 may comprise a flexible material adapted to hermetically seal the opening or the hole 22, 32, 42, 52 of the casing or packaging 26, 36, 46, 56. The enclosure 21, 31, 41, 51 may for example comprise a flexible layer and an additional adhesive or fixing layer, wherein the layers allow simple fixing of the sensor module 20, 30, 40, 50 over the opening or hole of the casing or packaging 26, 36, 46, 56. This approach is particularly advantageous when the surface 23 of the casing or packaging 26, 36, 46, 56 is flexible, i.e., wherein the sensor module 20, 30, 40, 50 is fixed on a flexible surface, e.g., in the form of a tag or an adhesive tape.

Figure 6:
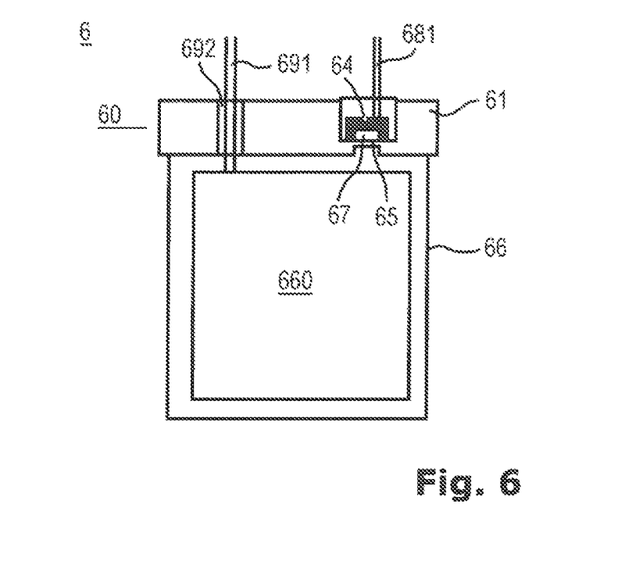
FIG. 6 shows a schematic cross-sectional side view representation of a battery element according to an embodiment.

Referring to FIG. 6, there is shown a schematic cross-sectional side view representation of a sensor module 60 according to an embodiment. The sensor module 60 comprises an enclosure 61 adapted to hermetically seal an opening of a casing 66. In the embodiment shown in FIG. 6, the enclosure 61 of the sensor module 60 comprises a hermetically sealing cap which is screwed or fixed by other means to hermetically seal an opening of the casing 66. Here, the casing or packaging 66 provides a container for a battery cell 660. It follows that FIG. 6 shows a battery element 6 comprising a sensor module 60, a battery cell 660 and a container enclosing the battery cell 660.

The battery cell 660 comprises for example electrolyte and electrodes. Moreover, the battery element 6 comprises power outlet cables 691 which conduct battery power current and extend from the battery cell 660 through the enclosure 61. In an embodiment, the power outlet cables 691 are hermetically sealed to the enclosure 61, e.g., by using a sealed or a casted hole 692. The sensor module 60 in FIG. 6 comprises a sensor element 64 which is arranged on an inner wall of the enclosure 61. The sensor element 64 may for example comprise a gas sensor or a pressure sensor. The sensor module 60 comprises a membrane 65 which is arranged between the enclosure 61 and the opening of the casing 66. The membrane 65 may comprise a film or a layer which may be a gas filter. For example, the membrane 65 may be diaphanous for certain types of gases which are produced in the electrolyte of the battery cell 660 when the battery is damaged or is being operated inappropriately.

In the embodiment of a sensor module shown in FIG. 6, the membrane 65 and enclosure 61 define a cavity 67. The membrane 65 may be pressure sensitive and may represent a part of the sensor element 64 for measuring the pressure difference between the gas pressures at the different sides of the membrane 65. In a further embodiment, the membrane 65 may be adapted to rupture, i.e., to become diaphanous, when the difference in pressures at the different sides of the membrane 65 exceeds a limit, i.e., when the gas pressure within the casing 66 increases, while the pressure inside the cavity 67 remains essentially constant. The sensor element 64 may be adapted to detect when the membrane 65 ruptures, which may indicate that the battery cell 660 has produced gases in the electrolyte and that the battery may be damaged or is being operated inappropriately. The sensor module 60 shown in FIG. 6 further comprises sensor cables 681 extending from the sensor element 64 to an outer surface of the enclosure 61. The sensor cables 681 are adapted to carry sensor signals provided by the sensor element 64.

In an embodiment, the battery element 6 may comprise a disconnector, wherein the disconnector is adapted to break the current flow from the battery cell 660 when the sensor element detects a predefined condition. The predefined condition may for example relate to a predetermined gas pressure limit being exceeded within the container of the battery cell 660. This may for example be detected by a sensor element 64 comprising a pressure sensor and/or wherein the membrane 65 is adapted to rupture, i.e., to become diaphanous, when the difference in pressures present on the different sides of the membrane 65 exceeds a limit. In a further embodiment, the predefined condition may for example relate to gas concentration exceeding a predefined limit, wherein the sensor element is adapted to sense the presence of selected gas types. The selected gas types may be gases produced in the electrolyte of the battery cell 660 when the battery is damaged or is being operated inappropriately. The disconnector may for example comprise any type of electrical switch, which may be used to break the current flow from the battery cell, e.g., to break the current flow in the power outlet cable 691 carrying the battery power current. For example, the disconnector may comprise a mechanical relay switch or a semiconductor based switch.

Further embodiments of the sensor module 10, 20, 30, 40, 50, 60 and the battery element 6 can be formed along the features and embodiments as described before in connection with the embodiments shown in FIGS. 1 to 6. In particular, further embodiments of the battery element 6 can be formed by combining the features and embodiments of the sensor module described in connection with FIGS. 1 to 5, with a battery cell and a respective flexible or rigid casing or packaging enclosing the battery cell.

Figure 7A:
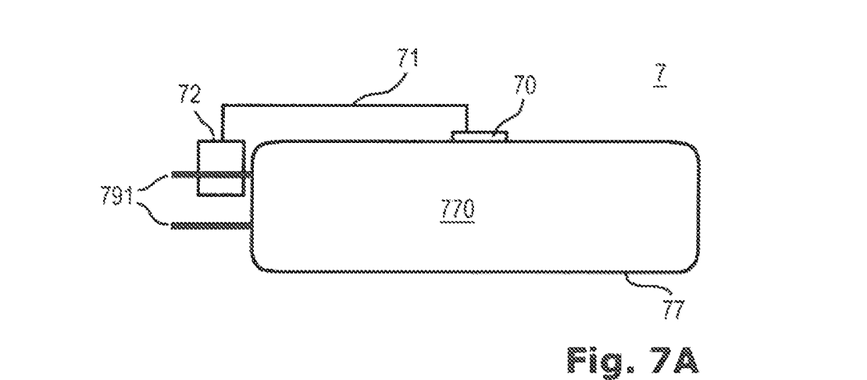
FIGS. 7a and 7b show a schematic cross-sectional side view representation of a battery element according to an embodiment.
Figure 7B:
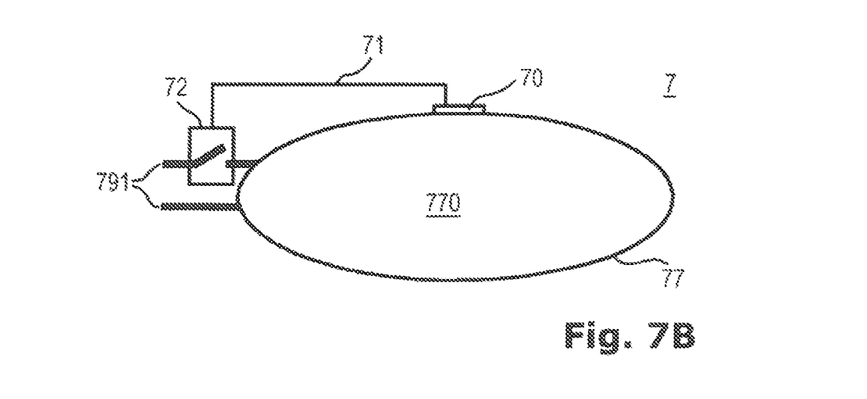

Referring to FIGS. 7a and 7b, there is shown a schematic cross-sectional side view representation of a battery element 7 according to an embodiment. The battery element 7 comprises a battery cell 770 and a flexible casing or packaging 77 enclosing the battery cell 770. Moreover, the battery element 7 further comprises a detector 70 which is arranged on the outer surface of the casing or packaging 77. In this embodiment, the detector 70 comprises a mechanical stress sensitive element which is responsive to surface deformation. In FIG. 7a, the battery cell is operating normally and no deformation of the surface of the flexible casing or packaging 77 is apparent. However, when the battery cell 770 is damaged or is operated inappropriately, the electrolyte of the battery cell 770 may generate gases, which increases the respective gas volume inside the flexible casing or packaging 77. Consequently, the surface of the flexible casing or packaging 77 deforms. The detector 70 is arranged on the surface of the casing or packaging 77 and is responsive to the surface deformation. In this embodiment, the detector 70 detects the deformation of the casing or packaging 77 and consequently triggers a disconnector 72 via wiring 71 to break the current flow from the battery cell 770. For this purpose, the disconnector 72 can comprise a switch, which is adapted to break the current flow in the battery power cable 791 connected to the battery cell 770. In other words, the disconnector 72 is adapted to break the current flow to or from the battery cell 770 when the detector 70 detects a surface deformation, i.e., a surface deformation which may indicate a malfunction of the battery cell 770. Here, the battery cell 770 may for example comprise a lithium or lithium ion battery.

Figure 8A:
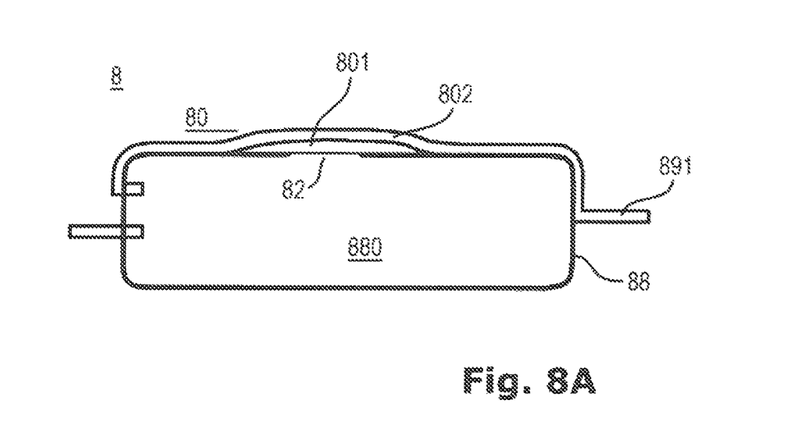
FIGS. 8a and 8b show a schematic cross-sectional side view representation of a battery element according to an embodiment.
Figure 8B:
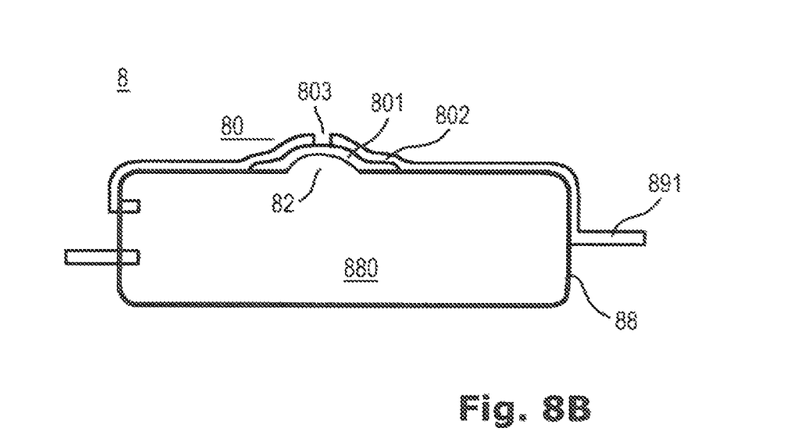

Referring to FIGS. 8a and 8b, there is shown a schematic cross-sectional side view representation of a battery element 8 according to an embodiment. The battery element 8 comprises a battery cell 880 and a stiff casing or packaging 88 enclosing the battery cell 880. Moreover, the battery element 8 further comprises a detector 80 which is arranged on the outer surface of the casing or packaging 88. In this embodiment, the detector 80 comprises a mechanical stress sensitive element 802 which is responsive to surface deformation. Moreover, the detector 80 comprises a flexible layer 801 to hermetically seal a hole 82 in the outer surface of the stiff casing or packaging 88 of the battery cell 880. The mechanical stress sensitive element 802 is arranged on a surface of the flexible layer 801, and the flexible layer 801 is arranged between the hole 82 and the mechanical stress sensitive element 802. It follows that the force exerted by a change in gas pressure inside the casing or packaging 88 of the battery cell 880 is conveyed through the flexible layer 801 to the mechanical stress sensitive element 802. In an embodiment, the mechanical stress sensitive element 802 comprises a strain gauge circuit for generating pressure dependent sensor signals. As mentioned above, an increase in gas pressure inside the casing or packaging 88 may indicate that the battery cell 880 has produced gases in the electrolyte, indicating that the battery is damaged or is being operated inappropriately.

in the embodiment of a battery element 8 shown in FIGS. 8*a* and 8*b* the mechanical stress sensitive element 802 may comprises a circuit path which is adapted to break the current flow in the circuit path when the mechanical stress exceeds a threshold indicating a malfunction of the battery cell. In the embodiment according to FIGS. 8*a* and 8*b*, the current flow in the circuit path may comprise the battery power current conducted by the battery power cable 891. For example, a malfunctioning battery cell 880 may produce gases in the electrolyte, which increase the gas pressure within the casing or packaging 88. The increased pressure pushes the flexible layer 801 away from the hole 82 and thereby exerts a mechanical stress on the mechanical stress sensitive element 802. Consequently, when the mechanical stress exceeds a threshold indicating a malfunction of the battery cell, the circuit path breaks and a gap 803 in the circuit path prevents power current from being drawn from the damaged or inappropriately operated battery cell 880. In an embodiment, the battery cell may for example comprise a lithium or lithium ion battery.

As mentioned above in connection with the embodiment according to FIGS. 8*a* and 8*b*, the current flow in the circuit path may comprise the battery power current conducted by the battery power cable 891. In a different embodiment, the circuit path does not conduct the battery power current, but comprises a resistor connected to a voltage source, wherein the current flow via the resistor indicates the degree of surface deformation on the casing or packaging of the battery cell 880. In another embodiment, the resistor is adapted to operate like a fuse and open the circuit when the above described mechanical stress exceeds a threshold indicating a malfunction of the battery cell 880.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A sensor module, comprising:
   an enclosure configured to hermetically seal an opening or a hole on an outer surface of a casing or packaging, wherein the enclosure comprises a stiff or flexible printed circuit board;
   a sensor element associated with the enclosure, wherein the sensor element comprises a semiconductor chip electrically contacted to the stiff or flexible printed circuit board; and
   a membrane, arranged between the enclosure and the opening or hole of the casing or packing.

2. The sensor module according to claim 1, wherein the sensor element comprises a pressure sensor, a gas sensor or a mechanical stress sensor, and wherein the membrane is a pressure sensitive membrane or a gas filter.

3. The sensor module according to claim 1, wherein the membrane comprises a film or layer arranged to cover the hole or opening in the casing or packaging, wherein the film or layer is a gas filter.

4. The sensor module according to claim 1, further comprising a sealing means, wherein the sealing means is adapted to have the enclosure hermetically seal the opening or hole of the casing or packaging, wherein the sealing means comprises a clamp, latch, screw, screw thread, edge sealing, flexible layer, adhesive layer, adhesive material or sealant material.

5. The sensor module according to claim 1, wherein the semiconductor chip comprises a communication means configured to modulate a sensor signal onto battery power current or configured to transmit a sensor signal by wireless communications.

6. The sensor module according to claim 1, further comprising cables extending from the semiconductor chip to a surface of the enclosure, wherein the cables are hermetically sealed by lamination between layers of the enclosure.

7. The sensor module according to claim 1, wherein the membrane and the enclosure define a cavity enclosing the sensor element.

8. The sensor module according to claim 7, wherein the sensor element is adapted to detect a rupture of the membrane due to an increase in gas pressure.

9. A battery element, comprising:
   a battery cell;
   a casing or packaging enclosing the battery cell;
   an enclosure configured to hermetically seal an opening or a hole on an outer surface of the casing or packaging;
   a sensor element, wherein the sensor element comprises a semiconductor chip;
   cables extending from the semiconductor chip to a surface of the enclosure, wherein the cables are hermetically sealed by lamination between layers of the enclosure; and
   a membrane, wherein the membrane is arranged between the enclosure and the opening or hole of the surface of the casing or packaging.

10. The battery element according to claim 9, wherein the enclosure comprises a cap of the casing or packaging enclosing the battery cell.

11. The battery element according to claim 9, wherein the sensor element comprises a pressure sensor, a gas sensor or a mechanical strain sensor and wherein the membrane is a pressure sensitive membrane or a gas filter.

12. The battery element according to claim 9, wherein the membrane comprises a film or layer arranged to cover the hole or opening on the outer surface of the casing or packaging, wherein the film or layer is a gas filter.

13. The battery element according to claim 9, further comprising a sealing means, wherein the sealing means is configured to have the enclosure hermetically seal the opening or hole on the outer surface of the casing or packaging, wherein the sealing means comprises a clamp, latch, screw, screw thread, seal ring, flexible layer, edge sealing, adhesive layer, adhesive material or sealant material.

14. The battery element according to claim 9, wherein the enclosure comprises a flexible material configured to hermetically seal the opening or the hole on the outer surface of the casing or packaging, wherein the casing or packaging is a rigid or a flexible body, or wherein the casing or packaging comprises at least one of rubber, foil, plastic, metal, steel and ceramic material.

15. The battery element according to claim 9, further comprising a disconnector, wherein the disconnector is configured to break current flow to or from the battery cell when the sensor element detects a predefined condition.

16. The battery element according to claim 9, wherein the battery cell is a lithium or lithium ion battery.

17. The battery element according to claim 9, wherein the membrane and the enclosure define a cavity enclosing the sensor element.

18. The battery element according to claim 17, wherein the sensor element is configured to detect a rupture of the membrane due to an increase in gas pressure inside the casing or packaging of the battery cell.

* * * * *

UNITED STATES PATENT AND TRADEMARK OFFICE
CERTIFICATE OF CORRECTION

| | | |
|---|---|---|
| PATENT NO. | : 9,209,497 B2 | Page 1 of 1 |
| APPLICATION NO. | : 13/717417 | |
| DATED | : December 8, 2015 | |
| INVENTOR(S) | : Klaus Elian | |

It is certified that error appears in the above-identified patent and that said Letters Patent is hereby corrected as shown below:

Claims

In Col. 8, line 8, claim 1, delete "a hole on an outer surface" and insert --hole on an outer surface--.

In Col. 8, line 16, claim 1, delete "casing or packing" and insert --casing or packaging--.

In Col. 8, line 51, claim 9, delete "a hole on an outer surface" and insert --hole on an outer surface--.

In Col. 8, line 60, claim 9, delete "the casing or packaging." and insert --the outer casing or packaging.--.

In Col. 9, line 14, claim 14, delete "the opening or the hole" and insert --the opening or hole--.

Signed and Sealed this
Third Day of May, 2016

Michelle K. Lee
*Director of the United States Patent and Trademark Office*